No. 861,036.  
A. W. KODATZ.  
TOASTER.  
APPLICATION FILED FEB. 26, 1907.
PATENTED JULY 23, 1907.
2 SHEETS—SHEET 1.
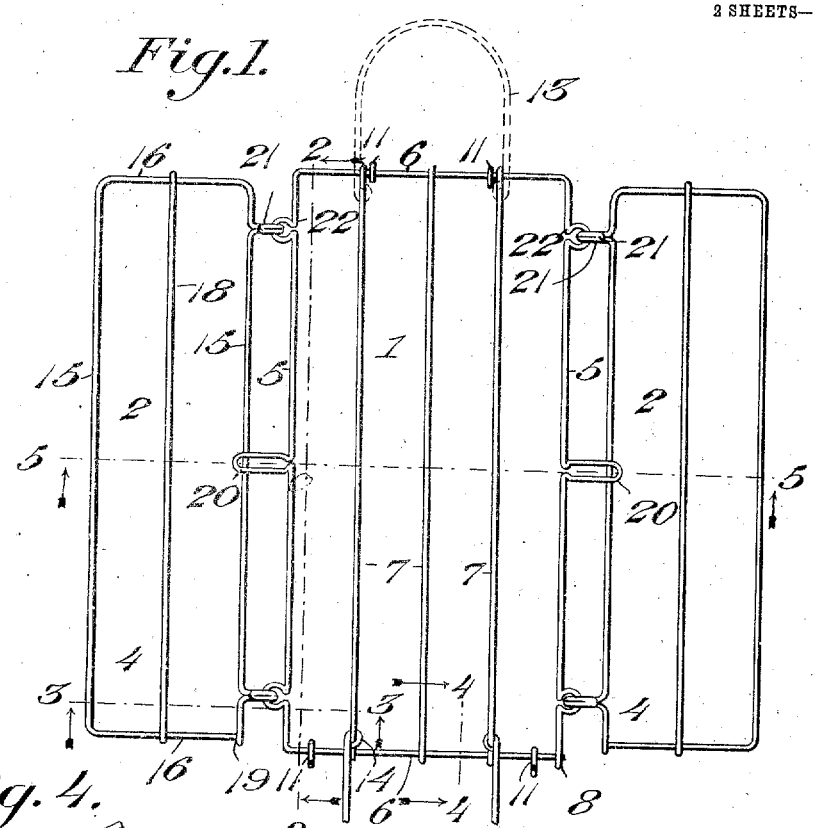
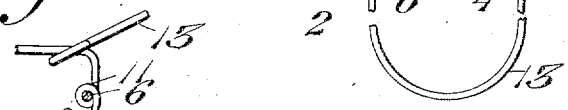
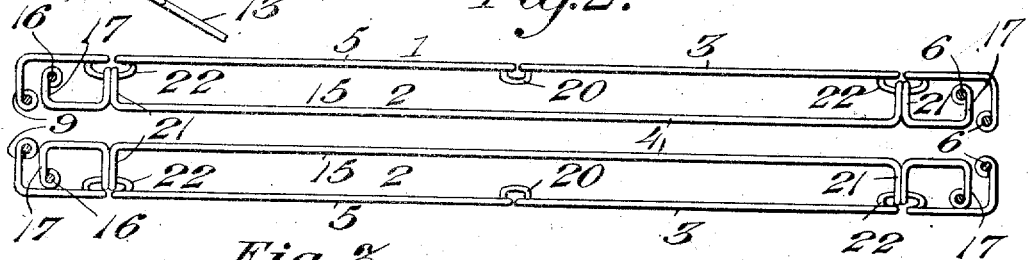
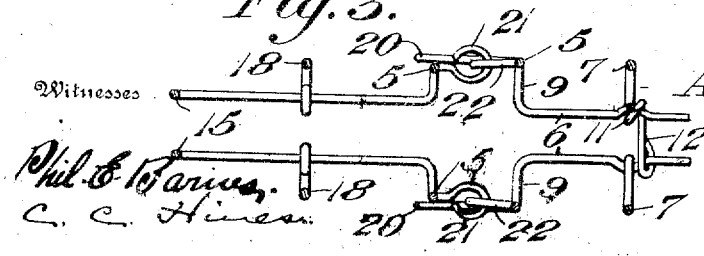
Inventor  
Anna W. Kodatz.  
By Victor J. Evans  
Attorney
Witnesses  
Phil E. Barnes  
C. C. Hines

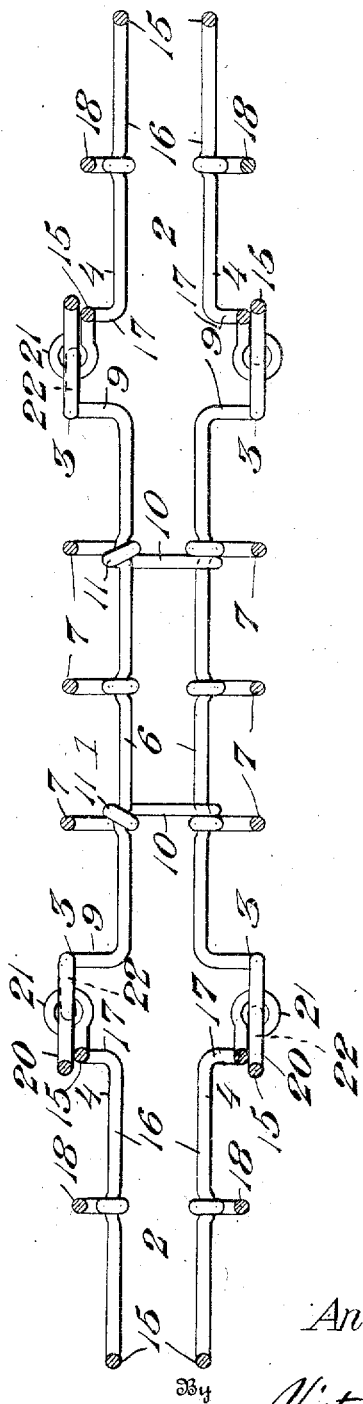

UNITED STATES PATENT OFFICE.

ANNA W. KODATZ, OF ANDERSON, INDIANA.

TOASTER.

No. 861,036.  Specification of Letters Patent.  Patented July 23, 1907.

Application filed February 26, 1907. Serial No. 359,379.

*To all whom it may concern:*

Be it known that I, ANNA W. KODATZ, a citizen of the United States, residing at Anderson, in the county of Madison and State of Indiana, have invented new and useful Improvements in Toasters, of which the following is a specification.

This invention relates to a novel and improved construction of toaster, one of the objects of the invention being to provide a culinary device of this nature which may be quickly and conveniently varied in size to toast a greater or less number of slices of bread or to suit the area of the bed of coals or flame over which the toasting is to be done and also folded in compact form for storage or shipment.

Another object of the invention is to provide a toaster having handles which are reversible from one end to the other of the toaster, thereby enabling the latter to be quickly turned around or reversed end for end, in order to adjust the slices of bread so that they may be quickly toasted over the entire surfaces thereof.

A still further object of the invention is to provide an extensible toaster which is simple of construction, efficient in use, inexpensive of production and which is adapted to securely retain and prevent the slices of bread from falling out and which forms a convenient and exceedingly useful culinary utensil.

In the accompanying drawings,—Figure 1 is a plan view of a toaster embodying my invention. Fig. 2 is a longitudinal section thereof on the line 2—2 of Fig. 1, showing the members of the side sections folded between the members of the central or main section. Fig. 3 is a detail transverse section on the line 3—3 of Fig. 1. Fig. 4 is a similar section on the line 4—4 of Fig. 1, showing one of the hinging and locking connections between the members of the main or central section. Fig. 5 is a central transverse section on the line 5—5 of Fig. 1, with the side sections extended, as shown in said figure.

In carrying my invention into practice, I provide a toaster comprising a main or central section 1 and folding side sections 2. The main section is composed of superposed members 3, and each side section of complemental superposed members 4, all of the parts being preferably formed of wire of a suitable gage or size. As shown, each member of the main section is of oblong rectangular form and consists of a single boundary wire bent to provide the outer longitudinal strands 5 and end or cross strands 6, the latter being connected by a suitable number of intermediate longitudinal strands 7 lying between the strands 5. The ends of the main wire forming the frame or portions 5 and 6 are suitably connected or interlocked at one end, as indicated at 8, while the intermediate longitudinal strands 7 are interlocked at their ends with the cross strands 6, but they may be connected in any other preferred manner. The cross strands 6 are arranged to lie inwardly of the flanges of the strands 5 and 7 by bending the ends of said strands 5 and 7 inwardly, as indicated at 9, so that the end portions of the members of the section 1 will project toward each other, the ends of the upper member projecting downwardly and those of the lower member upwardly, as will be readily understood, to form a receiving space between the members of sufficient depth to receive slices of bread of any prescribed size and also to receive the members of the side sections 2, as hereinafter described.

The members 3 of the main section are coupled at their ends by means of combined hinge or pivot locking members 10, each consisting of a piece of wire bent to provide an eye 11 engaging the adjacent cross piece 6 of one member and bent at the opposite end to form a hook 12 to engage the associated cross piece of the other member. Two of these hooks or hinging devices are preferably located at each end of the main section to pivotally connect the members thereof, the construction being such that when the hooks engage the cross pieces of the two members, as shown in Fig. 4 the said members will be locked together in closed position to retain the slices of bread therebetween, while by swinging the hinges at one end to throw their hooks out of engagement with the cross piece of the section of the member with which they are connected, the other member may be swung upwardly and rearwardly on the hinges connecting the other ends of said members to open the main section of the toaster for the reception of slices of bread to be toasted or removal of slices which have been toasted. The slices of bread are retained in the main section by the bent end portions 9, which form stops or abutments, and are prevented from working out at the sides of said main section by the construction of the side sections 2, hereinafter described. Each member of the main section is provided with a wire bail handle 13, the ends of which are bent to form eyes 14 slidably and pivotally engaging two of the intermediate rods 7 of said member. The handles of the two sections are thus adapted to be reversed or slid longitudinally on said intermediate rods or strands longitudinally of the main section so that they may be brought to project beyond either end thereof, it being understood that the handles when turned outwardly rest against the adjacent cross strands 6 at the end of the main section and are simultaneously gripped in the hand of the operator.

It is often found in the operation of toasting that the portions of the slices of bread at the end of the toaster opposite the handle thereof are imperfectly toasted or browned, which condition can only be remedied in the ordinary form of toaster by shifting the slices in the toaster, an obvious disadvantage which it is a desideratum to avoid. This objection is overcome by the provision in my device of the reversible handles 13 which may be quickly and conveniently shifted from one end of the toaster to the other, thus allowing the toaster to be turned around or reversed end to end, to enable the slices of bread to be quickly toasted throughout their surfaces. It will be understood, of course, that the handles also adapt the toaster to be turned over in the usual manner, that is to swing either side or member of the toaster frame uppermost, so that the opposite surfaces of the slices of bread may be toasted in the usual manner.

The members of each end section 2 are generally similar in construction to the main or central section 1, each comprising a frame of wire preferably formed by a single piece of wire bent to provide longitudinal outer strands 15 and end pieces or cross strands 16, which latter are arranged to extend inwardly relative to the opposite surfaces of the toaster by bending the longitudinal strands at their ends, as indicated at 17, one or more intermediate longitudinal strands 18 being extended between the end pieces 16 according to the width of the end sections to be employed, the terminals of the wire forming the parts 15 and 16 being interlocked, as indicated at 19.

It will be understood that the inward bending of the parts 16 causes those portions of the members of each end frame to approach each other or come into contact to close the ends of each end section to prevent the slices of bread from sliding out at those points. The outer sides of the end sections may be similarly bent, but it is found in practice that the pressure of the members of such sections on the bread is sufficient to hold them from lateral movement, the slices being less liable to shift laterally than longitudinally, which latter movement is liable to ensue when the toaster is tilted in the well known process of toasting, the tendency of lateral shifting being caused only when the device is reversed to expose the upper surfaces of the slices to the fire after the lower slices have been toasted, and this tendency to shifting may be overcome by reversing the toaster endwise instead of sidewise, as will be readily understood. In this operation the end abutments 9 and 17 of the toaster sections will prevent the slices from the sliding longitudinally in the toaster.

The members of the end sections 2 are held from downward movement when either side of the toaster is disposed lowermost by braces or extensions 20 projecting from the longitudinal strands 5 and which are adapted to be engaged by the strands 15, and said members of the side sections are pivotally connected with the members of the main or central section in some suitable manner, as by providing the strands 15 with hooks 21 to pivotally engage eyes on the strands 5. These hooks and eyes are so arranged as to permit the members of the side sections 2 to fold between the members of the main or central section 1 in a manner clearly indicated in Fig. 2, so that when said members of the side sections are thus folded the longitudinal strands 15 and 18 thereof will lie in the plane of the end or cross strands 6 of the members of the main section and will form grated supports or bearing surfaces against which the sides of the slices of bread rest when placed in the main section for toasting.

The main or central section may be in practice of sufficient size to receive, say, four slices of bread, and the side sections 2 may be of sufficient size to increase the area of the toaster two fold when said sections are extended, thus adapting the toaster to receive eight slices.

It will be thus understood that the toaster may be extended, by the arrangement of the parts, as shown in Fig. 1, to receive the maximum number of slices of bread or for toasting over a flame or bed of coals of comparatively large area, while by folding the side sections 2 inwardly the toaster will be reduced one-half in size for toasting a similar number of slices over a small fire. As a result, a toaster of very simple construction is provided which may be extended or contracted to suit different conditions of service and which when contracted will be folded in small compass so that it may be conveniently stored or shipped.

The reversible handles constitute an important and valuable feature of the invention and may be used in connection with the specific form of toaster disclosed or on any other form of toaster to which they may be applied to perform the function set forth, that is, of enabling the toaster to be reversed end for end in a convenient manner.

Having thus described the invention, what is claimed as new, is:—

1. A toaster comprising a frame composed of two members, each member having a combined lock and hinge connection at each end with the other, whereby the frame may be opened at either end, and handles on said members adjustable from end to end thereof.

2. A toaster comprising a main section formed of pivotally connected members, and side sections pivotally connected to said members and adapted to fold between the same.

3. A toaster comprising a main section composed of pivotally connected members, and side sections composed of members hinged to the members of the main section, the members of the side sections being adapted to fold between the members of the main section.

4. A toaster comprising a main section composed of pivotally connected members and side sections, each composed of a pair of members hinged to the members of the main section, said members of the side sections being adapted to fold between the members of the main section, and stays upon the members of the main section to support the extended members of the side sections.

5. A toaster comprising a main section composed of complemental members, coupling hinges pivotally connecting the ends of said members, side sections, each composed of a pair of members hinged to the members of the main section and adapted to fold between the same, means for staying the members of the side sections from the main section when extended, and handles on the members of the main section adjustable from end to end of said section.

In testimony whereof, I affix my signature in presence of two witnesses.

ANNA W. KODATZ.

Witnesses:
KATHERINE A. CHIPMAN,
D. O. CHIPMAN.